United States Patent
Bowron (10) Patent No.: US 6,644,813 B1
(45) Date of Patent: Nov. 11, 2003

(54) FOUR PRISM COLOR MANAGEMENT SYSTEM FOR PROJECTION SYSTEMS

(75) Inventor: John W. Bowron, Penetanguishene (CA)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/041,164

(22) Filed: Jan. 4, 2002

(51) Int. Cl.[7] .......................... G03B 21/14; G03B 21/28; G02F 1/1335; G02B 5/04; H04N 5/74
(52) U.S. Cl. .............................. 353/31; 353/33; 353/81; 353/20; 349/9; 359/831; 359/833; 359/834; 359/837; 348/756
(58) Field of Search ........................ 353/33, 31, 34, 353/37, 20, 81, 82; 359/831, 853, 834, 837, 833; 348/757, 756; 349/5, 8, 9

(56) References Cited

U.S. PATENT DOCUMENTS

| 4,857,997 A | * | 8/1989 | Fukami et al. ................ 358/55 |
| 6,052,231 A | * | 4/2000 | Rosenbluth ................ 359/636 |
| 6,229,581 B1 | * | 5/2001 | Yamamoto et al. .......... 348/757 |
| 6,250,763 B1 | * | 6/2001 | Fielding et al. ................ 353/31 |

* cited by examiner

Primary Examiner—Russell Adams
Assistant Examiner—Melissa Koval
(74) Attorney, Agent, or Firm—William C. Schubert; Glenn H. Lenzen, Jr.

(57) ABSTRACT

A 4-prism color management device (600) comprised of first, second, third, and fourth prisms (610, 612, 614, 616). The first prism (610) is adjacent to the second prism (612) with an air gap (620) interposed therebetween, the second prism (612) is adjacent to the third prism (614) with an air gap (624) interposed therebetween, and the third (614) prism is adjacent to the fourth prism (616) with an air gap (626) interposed therebetween. The first prism (610) includes a first surface (630) for inputting and outputting a beam of light. The second prism (612) includes a first dichroic surface (642) mounted at a first angle ($\beta$) with respect to the first surface (630) for reflecting light of a first color and for transmitting light of a second color and light of a third color. The third prism (614) includes a second dichroic surface (644) mounted at a second angle ($\chi$) with respect to the first surface (630) for reflecting light of the second color and for transmitting light of the third color.

15 Claims, 4 Drawing Sheets

FOUR PRISM COLOR MANAGEMENT SYSTEM FOR PROJECTION SYSTEMS

BACKGROUND OF THE INVENTION

1. Field of the Invention

The present invention relates to optical systems. More specifically, the present invention relates to optical devices used for separating white light into red, green, and blue light, and devices used for combining red, green, and blue light into white light.

2. Description of the Related Art

The principle of tristimulus colorimetry is used in optical imaging or display systems to generate the full range of colors. Most display systems utilize the red green blue tristimulus system in which any color is created from the appropriate combination of red, green, and blue. White light occupies part of the electromagnetic spectrum ranging from approximately $4.3 \times 10^{14}$ Hertz to $7.5 \times 10^{14}$ Hertz and within this spectrum blue and red light occupy the high and low frequency ends respectively while green represents the central frequency band of the visible spectrum.

Specific examples of display systems where the invention is applicable are Liquid Crystal Displays (LCD's), Reflective Liquid Crystal Displays (R-LCD's) and reflective Digital Micromirror Devices (DMD's). These systems generally employ three such display panels one each for color red, green, and blue.

Certain display and imaging systems utilize the principle of thin film interference to separate frequency bands of white light to generate red, green, and blue. Specifically, color separation is often achieved using frequency sensitive optical multilayer coatings of dielectric materials applied to thin glass plates. The tristimulus form of color separation of white light into red, green, and blue is accomplished when these coatings are applied to a number of color selective, i.e. dichroic, mirrors. The dichroic mirrors are then arranged in any number of configurations to create channels of red, green, and blue light. However, these arrangements are bulky and require expensive support structures to support the mirrors and lenses in the desired configuration. In addition, these arrangements require lenses with long back focal lengths when used in imaging systems.

High-end projection systems require optical prisms with dichroic coatings for color management. Normally, different coating designs and a different type of prism is used for LCD, R-LCD and DMD projector types. These prisms should be as small as possible, efficient, and useable at high light flux. It would be advantageous to have a common design that could be used for both polarized and unpolarized types of projectors. An efficient prism that works well with polarized and unpolarized light needs to be made by reducing the angles of incidence on the dichroic coatings. An angle substantially less than 30 degrees is required to be an improvement over prior art.

LCD and other projection systems that require the use of single pass polarized light generally employ a x-cube (4-prism) color management component. The x-cube is very compact and minimizes the back focal length required by the projection lens. Coating design is greatly simplified when the device is used with systems using polarized light of a single type in each channel, but the large angle of incidence causes problems for systems using unpolarized light. Unpolarized light or randomly polarized light is equivalent to an equal mixture of both polarization types. A double pass arrangement as required by an R-LCD also places a difficult constraint on the coating design since light of both s-type (perpendicular to a plane of incidence) and p-type (parallel to that plane of incidence) polarization is used in each channel. A major disadvantage of the x-cube is that the nominal angle of incidence for both the red and blue dichroic coatings is 45 degrees. In general, the performance of such coatings decreases as angle of incidence increases. This leads to decreased transmission and an increased separation between the s- and p-polarized transmission curves. Another disadvantage is that these prisms are generally limited to moderate flux levels because the prisms are cemented together and will break at high flux levels.

DLP and other projection systems, which require the use of either unpolarized or mixed polarization light generally, use a Philips color prism (3-prism, double pass) for color management. These prisms are larger and more expensive than x-cubes; however, they can be used at high flux since no cemented interfaces are required. Coating design is more difficult in these cases since good performance must be obtained for s- and p-polarization simultaneously. The Philips prism geometry is helpful since the angles of incidence on the red and blue dichroic surfaces are about 12 and 30 degrees respectively. These prisms were originally designed for color television cameras. Both camera and DLP systems were intended to be used with unpolarized light. Some problems occur when polarized light is used, particularly with the blue coating at 30 degrees angle of incidence.

Hence, a need exists in the art for an improved color management system which works well with both unpolarized light and double pass polarized light with a lower angle of incidence than has previously been achieved.

SUMMARY OF THE INVENTION

The need in the art is addressed by the present invention, a 4-prism color management device that is optimized for use with unpolarized light, that is, for both s- and p-type polarization simultaneously. It can therefore be used in both a double pass reflective LCD projection system as well as a DMD based projection system. Decreased angles of incidence will allow this device to perform better than existing devices.

In the illustrative embodiment, the invention is comprised of first, second, third, and fourth prisms. The first prism is adjacent to the second prism, the second prism is adjacent to the third prism, and the third prism is adjacent to the fourth prism. The first prism includes a first surface for inputting and outputting a beam of light. The second prism includes a first dichroic surface mounted at a first angle with respect to the first surface for reflecting light of a first color and for transmitting light of a second color and light of a third color. The third prism includes a second dichroic surface mounted at a second angle with respect to the first surface for reflecting light of the second color and for transmitting light of the third color.

In a specific implementation, the first angle is approximately 11 degrees and the second angle is approximately 20 degrees. The first, second, and third colors correspond to blue, red, and green, respectively. The first and second dichroic surfaces are optimized for both s- and p-type polarized light. The first prism can be constructed from a material different from the second, third, and fourth prisms in order to help correct lateral color aberration in the projection lens.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
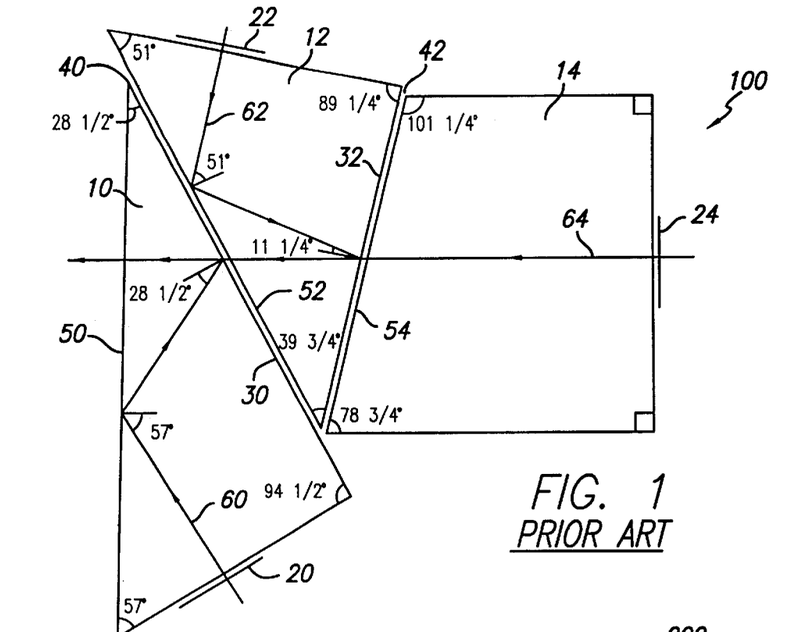
FIG. 1 is a digram of a conventional Philips 3-prism color management device.

FIG. 1 is a diagram of a conventional Philips 3-prism color management device 100. The device 100 includes a first prism 10 with a blue-reflecting dichroic surface 30, a second prism 12 with a red-reflecting dichroic surface 32, and a third prism 14. The size of each prism is chosen so that the optical path length for red, green, and blue light are identical when used in double pass for a DMD system. The illumination light is injected via a TIR (total internal reflection) prism (not shown) 22 degrees off-axis (not shown). "On" light reflected from the DMD panels traces the path shown in the figure.

A beam of blue light 60 reflected from a blue DMD panel 20 in a f/2.5 cone impinges on a first surface 50 at an angle of 49.4–64.6 degrees and undergoes total internal reflection. Note that the critical angle for total internal reflection in BK7 (optical grade glass which the prisms are typically made of) is 41.2 degrees. This light is then reflected from a blue-reflecting dichroic surface 30 at a nominal angle of incidence (AOI) of 28.5 degrees, and exits the blue prism 10 through the first surface 50 at a nominal AOI of 0 degrees.

A beam of red light 62 reflected from a red DMD panel 22 in a f/2.5 cone impinges on a second surface 52 at an angle of 43.4–58.6 degrees and undergoes TIR. An air gap 40 is needed between the second surface 52 of the red prism 12 and the blue dichroic surface 50 of the blue prism 10 in order to achieve TIR. The air gap 40 must be smaller than 10 microns to avoid optical aberrations but large enough to avoid evanescent coupling between the two prisms. The light 62 is then reflected from a red-reflecting dichroic surface 32 at a nominal AOI of 11.25 degrees, and exits the red prism 12 through the second surface 52 into the air gap 40. The light is transmitted through the blue dichroic surface 30 (at an AOI of 28.5 degrees) and exits the blue prism 10 through the first surface 50 at a nominal AOI of 0 degrees.

A beam of green light 64 reflected from a green DMD panel 24 in a f/2.5 cone exits the green prism 14 though a third surface 54 into an air gap 42 between the third surface 54 of the green prism 14 and the red dichroic surface 32 of the red prism 12. The light is then transmitted through the red dichroic surface 32 into the red prism 12. The light continues through the second surface 52 and exits the red prism 12 into the air gap 40. Then the light is transmitted through the blue dichroic surface 30 into the blue prism 10, and exits the blue prism 10 through the first surface 50 at a nominal AOI of zero degrees.

It is difficult to show the illumination light path in FIG. 1. However, it is injected at a 22 degree angle (in air) into the page and the effective angle of incidence can be calculated using a formula to account for compound angle of incidence. A 22 degree angle in air corresponds to a 14.3 degree angle in BK7 by Snell's Law. The following formula is used to calculate the effective AOI for a given angle θ:

$$\theta_{\textit{eff}} = \tan^{-1}[\sqrt{\tan^2(14.3) + \tan^2(\theta)}] \qquad [1]$$

Figure 2:
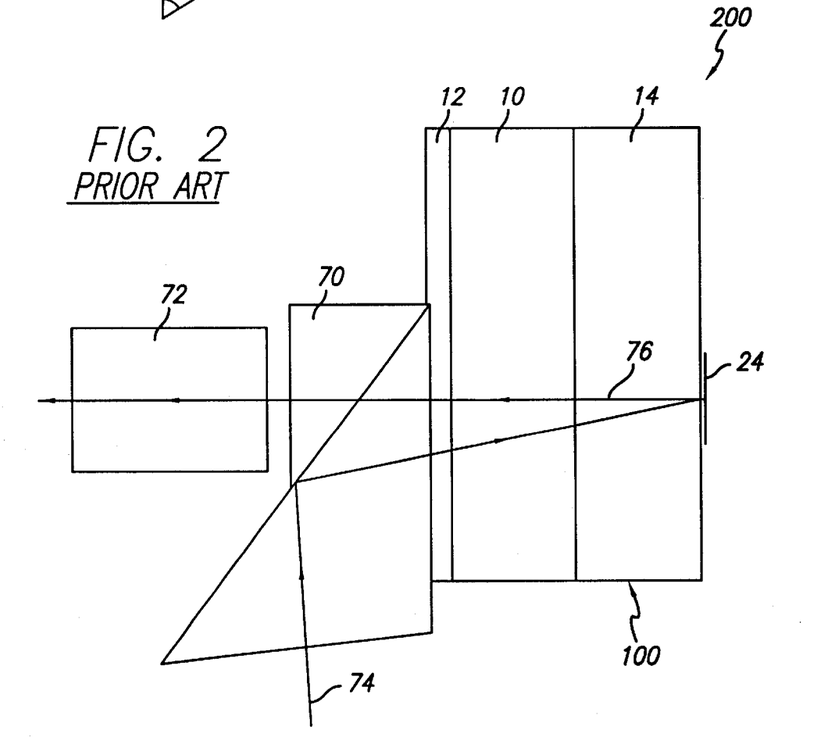
FIG. 2 is a digram showing a side view of the prism of FIG. 1 and how it would be used in a projection system in accordance with conventional teachings for a DMD system.

FIG. 2 is a diagram showing a side view of the color device 100 of FIG. 1 and how it would be used in a projection system 200 in accordance with conventional teachings. The illumination light 74 is injected into the 3-prism color device 100 (comprised of a red prism 12, a blue prism 10, and a green prism 14) via a TIR prism 70 22 degrees off-axis. This is considered the first pass. The light 74 is separated into red, blue, and green by the color device 100 and reflected off the appropriate DMD panel, such as the green DMD panel 24 shown. The on-axis projected light 76 (second pass) reflected from the DMD then passes through the color device 100, the TIR prism 70, and projection lens 72. The TIR prism and color device contribute a total of 85 mm of glass to the back focal length requirement of the projection lens (assuming a 0.86" diagonal panel).

The following table summarizes the nominal angles for the first pass (illumination) and second pass (projection) through the 3-prism color device:

TABLE 1

| Important angles for prior art Philips prism. | | |
|---|---|---|
|  | First Pass | Second Pass |
| Blue Dichroic AOI | 31.0° | 28.5° |
| Blue TIR | 57.4° | 57.0° |
| Red Dichroic AOI | 17.9° | 11.25° |
| Red TIR | 51.6° | 51.0° |

The 3-prism device of FIG. 1 works fairly well with unpolarized light, as is used in DMD systems, and can handle large amounts of light since the prisms are not cemented together. However, the device does not work as well with some polarized light systems. Furthermore, new requirements in the marketplace call for an improvement on the 30 degrees angle of incidence on the blue dichroic mirror.

Figure 3A:
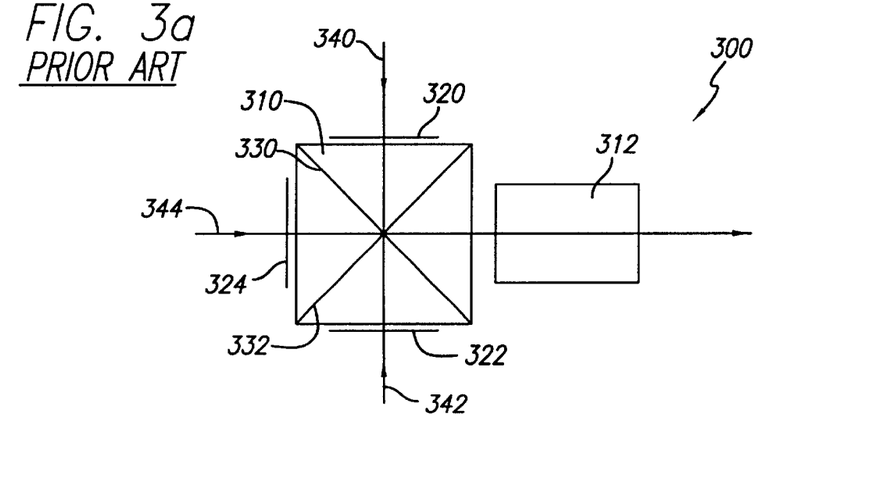
FIGS. 3a and 3b are diagrams of a transmissive LCD projection system and a reflective LCD projection system, respectively; using a conventional x-cube color management device in single pass.
Figure 3B:
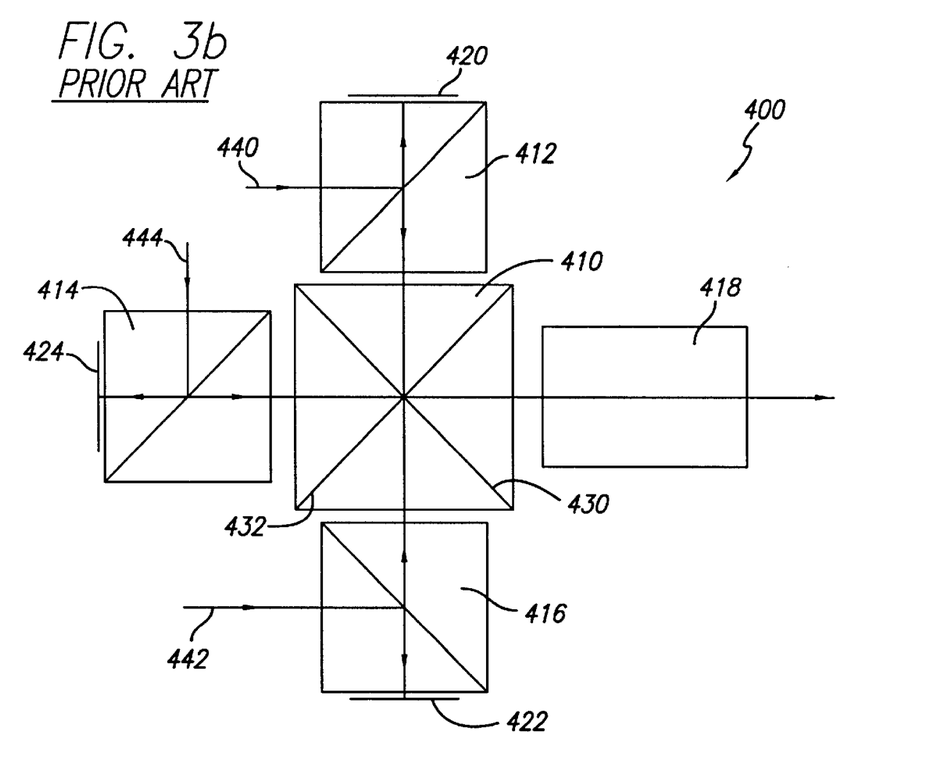

FIGS. 3a and 3b are diagrams of a transmissive LCD projection system 300 and a reflective LCD (R-LCD) projection system 400, respectively, using a conventional x-cube color management device. In both cases, the x-cube is used in single pass and the nominal angle of incidence is 45 degrees for both the red and blue dichroic coatings.

FIG. 3a shows how an x-cube 310 is typically used in a transmissive LCD projector. A beam of red light 340 is transmitted through a red LCD 320 into the x-cube 310 at an angle of incidence of 0 degrees. The red light 340 impinges on a red-reflecting dichroic mirror 330 at an AOI of 45 degrees and is reflected out of the x-cube 310 at an AOI of 0 degrees and into the projection lens 312. Similarly, a beam of blue light 342 is transmitted through a blue LCD 322 into the x-cube 310 at an AOI of 0 degrees. The blue light 342 impinges on a blue-reflecting dichroic mirror 332 at an AOI of 45 degrees and is reflected out of the x-cube 310 at an AOI of 0 degrees and into the projection lens 312. Finally, a beam of green light 344 is transmitted through a green LCD 324 into the x-cube 310 at an AOI of 0 degrees. The green light 344 passes through the red and blue dichroic mirrors out of the x-cube 310 at an AOI of 0 degrees and into the projection lens 312.

FIG. 3b shows how an x-cube 410 is typically used in a reflective LCD projector. A beam of red light 440 is injected into a polarization beam splitter 412 and reflected to a red reflective-LCD 420. If the red LCD 420 is in the "On" state, it changes the polarization of the red light 440, and reflects it back into the polarization beam splitter (PBS) 412 and into the x-cube 410. The red light 440 impinges on a red-reflecting dichroic mirror 430 at an AOI of 45 degrees and is reflected out of the x-cube 410 at an AOI of 0 degrees and into a projection lens 418. Similarly, a beam of blue light 442 is injected into a polarization beam splitter 416 and reflected to a blue reflective-LCD 422. If the blue LCD 422 is in the "On" state, it changes the polarization of the blue light 442, and reflects it back into the polarization beam splitter 416 and into the x-cube 410. The blue light 442 impinges on a blue-reflecting dichroic mirror 432 at an AOI of 45 degrees and is reflected out of the x-cube 410 at an AOI of 0 degrees and into a projection lens 418. Finally, a beam of green light 444 is injected into a polarization beam splitter 414 and reflected to a green reflective-LCD 424. If the green LCD 424 is in the "On" state, it changes the polarization of the green light 444, and reflects it back into the polarization beam splitter 414 and into the x-cube 410. The green light 444 passes through the red and blue dichroic mirrors and out of the x-cube 410 at an AOI of 0 degrees and into a projection lens 418.

Because the prism is used in single pass, the design of the dichroic coatings can be optimized for a specific polarization. It is typical to use s-polarization in the red and blue channels and p-polarization in the green channel. It is possible for the reflective LCD system to use an x-cube in double pass, although this system would not work well.

Figure 4:
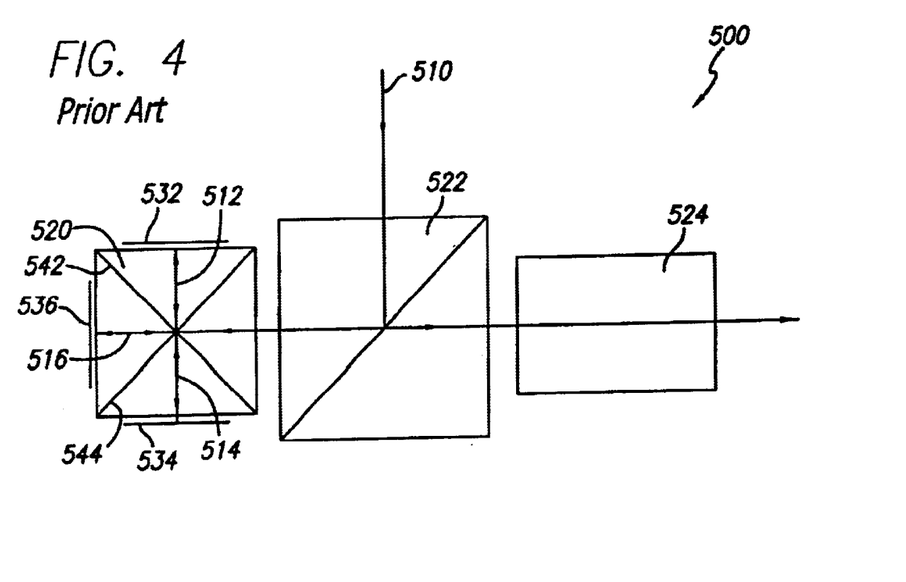
FIG. 4 is a diagram of a reflective LCD projection system using a conventional x-cube color management device in double pass.

FIG. 4 is a diagram of a reflective LCD projection system 500 using a conventional x-cube color management device 520 in double pass. A beam of white s-polarized light 510 is injected into a polarization beam splitter 522 and reflected into the x-cube 520 at an AOI of 0 degrees. The white light 510 impinges on a red-reflecting dichroic mirror 542 at an AOI of 45 degrees and a blue-reflecting mirror 544 at an AOI of 45 degrees. The red dichroic mirror 542 separates red light from the white light 510, forming a red beam 512 which is reflected towards a red reflective-LCD 532. If the red LCD 532 is in the "On" state, it changes the polarization of the red light 512 to p-type and reflects it back into the x-cube 520. The red dichroic mirror 542 reflects the red light 512 out of the x-cube 520, through the PBS cube 522, and into a projection lens 524.

The blue dichroic mirror 544 separates blue light from the white light 510, forming a blue beam 514 which is reflected towards a blue reflective-LCD 534. If the blue LCD 534 is in the "On" state, it changes the polarization of the blue light 514 to p-type and reflects it back into the x-cube 520. The blue dichroic mirror 544 reflects the blue light 514 out of the x-cube 520, through the PBS cube 522, and into the projection lens 524.

The light remaining from the white light 510 passes through the red and blue dichroic mirrors and forms a green beam 516 which reflects off a green reflective-LCD 536. If the green LCD 536 is in the "On" state, it changes the polarization of the green light 516 to p-type and reflects it back into the x-cube 520. The green light 516 passes through the red and blue dichroic mirrors out of the x-cube 520, through the PBS cube 522, and into the projection lens 524.

The reflective LCD projection system of FIG. 4 is much more compact as it eliminates the need for two polarization beam splitters and all the color separation optics. In this case, the dichroic coatings must work well for both s- and p-type polarization. However, since the angle of incidence is 45 degrees, an x-cube does not work well.

The present invention is a 4-prism color management device which is optimized for use with unpolarized light, that is, for both s- and p-type polarization simultaneously. It can therefore be used in both a double pass reflective LCD system such as that of FIG. 4 as well as a DMD system such as that of FIG. 2. Decreased angles of incidence will allow this device to perform better than existing devices.

Figure 5:
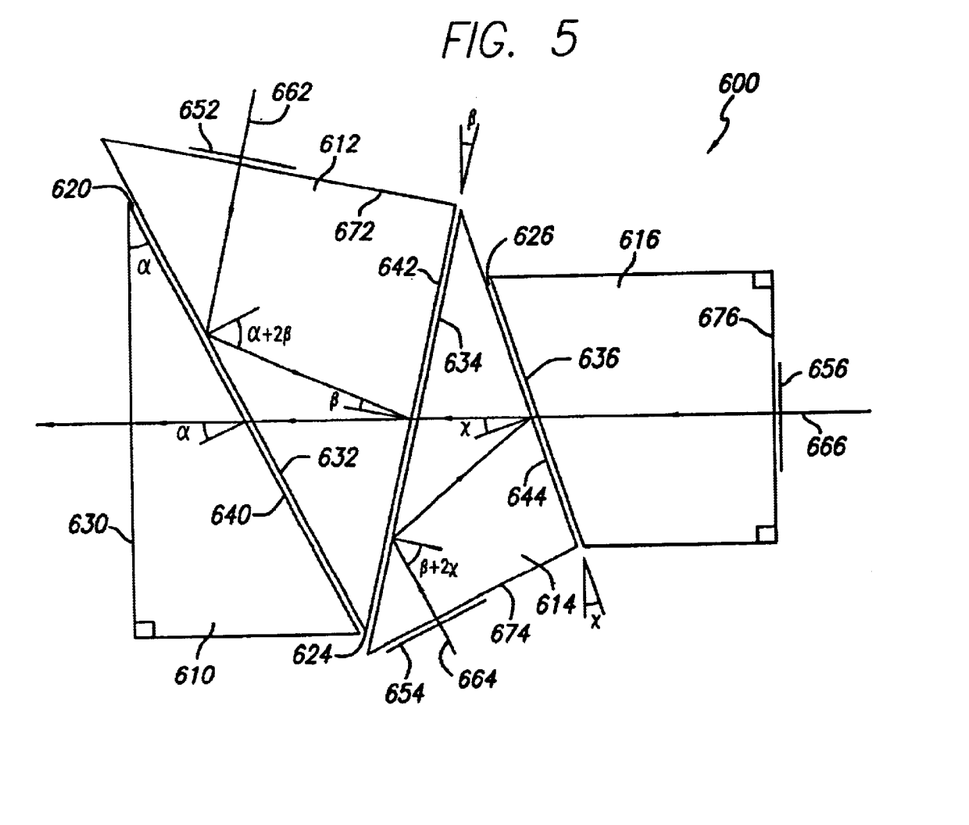
FIG. 5 is a diagram of a 4-prism color management device designed in accordance with the teachings of the present invention.

FIG. 5 is a diagram of a 4-prism color management device 600 designed in accordance with the teachings of the present invention. The device 600 includes 4 prisms: a first prism 610 with no dichroic coatings, a second prism 612 with a blue-reflecting dichroic coating on one surface 642, a third prism 614 with a red-reflecting dichroic coating on one surface 644, and a fourth prism 616 for handling green light.

The first prism 610 is a dummy prism with no coatings to match path lengths and allow lower angles of incidence on the dichroic coatings. It includes a first surface 630 and a second surface 640. The angle between the first and second surfaces is labeled $\alpha$.

The second prism 612 includes a third surface 632, a fourth surface 672, and the blue dichroic surface 642. An air gap 620 exists between the second surface 640 of the first prism 610 and the third surface 632 of the second prism 612. This air gap 620 allows total internal reflection in the second prism 612 at the third surface 632. The gap 620 must be no larger than 10 microns in order to avoid optical aberrations. A blue panel 652 is next to the fourth surface 672. The angle of the blue dichroic surface 642 relative to the normal (i.e. to the first surface 630) is labeled $\beta$.

The third prism 614 includes a fifth surface 634, a sixth surface 674, and the red dichroic surface 644. An air gap 624 exists between the blue dichroic surface 642 of the second prism 612 and the fifth surface 634 of the third prism 614. This air gap 624 allows total internal reflection in the third prism 614 at the fifth surface 634. The gap 624 must be no larger than 10 microns in order to avoid optical aberrations. A red panel 654 is next to the sixth surface 674. The angle of the red dichroic surface 644 relative to the normal (i.e. to the first surface 630) is labeled $\chi$.

The fourth prism 616 includes a seventh surface 636 and an eighth surface 676. An air gap 626 exists between the red dichroic surface 644 of the third prism 614 and the seventh surface 636 of the fourth prism 616. The gap 626 must be no larger than 10 microns in order to avoid optical aberrations. A green panel 656 is next to the eighth surface 676.

"On" light from the panels traces the path shown in the figure. A beam of blue light 662 reflected from the blue panel 652 impinges on the third surface 632 at an angle of $\alpha+2\beta$ degrees and undergoes total internal reflection. This light is then reflected from the blue dichroic surface 642 at an angle of incidence of $\beta$ degrees, and exits the blue prism 612 through the third surface 632. The light passes through the air gap 620 and into the first prism 610 through the second surface 640. Finally, the light exits the first prism 610 through the first surface 630 at a nominal AOI of 0 degrees.

A beam of red light 664 reflected from the red panel 654 impinges on the fifth surface 634 at an angle of β+2χ degrees and undergoes TIR. This light is then reflected from the red dichroic surface 644 at an angle of incidence of χ degrees, and exits the red prism 614 through the fifth surface 634. The light passes through the air gap 624 and into the second prism 612 through the blue dichroic surface 642. The light continues through the second prism 612 and exits through the third surface 632. The light passes through the air gap 620 and into the first prism 610 through the second surface 640. Finally, the light exits the first prism 610 through the first surface 630 at a nominal AOI of 0 degrees.

A beam of green light 666 reflected from the green panel 656 passes through the fourth prism 616 through the seventh surface 636. The light passes through the air gap 626 and into the third prism 614 through the red dichroic surface 644. The light continues through the third prism 614 and exits through the fifth surface 634. The light passes through the air gap 624 and into the second prism 612 through the blue dichroic surface 642. The light continues through the second prism 612 and exits through the third surface 632. The light passes through the air gap 620 and into the first prism 610 through the second surface 640. Finally, the light exits the first prism 610 through the first surface 630 at a nominal AOI of 0 degrees.

The four prisms are made of optical grade glass or other suitable material. Since the light in each channel goes through the same distance in the first dummy prism 610, this allows for the possibility of changing the glass type of the first prism 610 relative to the type of glass used for the other three prisms. This can be used as a design variable in conjunction with the projection lens design. It is expected that this can be used to simplify the color correction of the projection lens.

The blue AOI (on the blue dichroic coating) is β, the blue TIR angle is β+2β, the red AOI is χ, and the red TIR angle is β+2χ when considering the light in second pass. If both the TIR angles are assigned a constant value of 51 degrees (consistent with the prior art Philips prism of FIG. 1), then the following table of values can be obtained assuming a DLP application (as in FIG. 2):

TABLE 2

Illustrative angles for 4-prism design.

| | First Pass | | Second Pass | |
|---|---|---|---|---|
| α | Blue AOI | Red AOI | Blue AOI | Red AOI |
| 31.5° | 17.1° | 24.4° | 9.75° | 20.625° |
| 30.0° | 17.5° | 24.2° | 10.5° | 20.25° |
| 28.5° | 17.9° | 23.9° | 11.25° | 19.875° |
| 27.0° | 18.4° | 23.6° | 12.0° | 19.5° |
| 25.5° | 18.8° | 23.3° | 12.75° | 19.125° |

The middle row with α=28.5° can be compared directly to the values from Table 1. The blue AOI is reduced by 13.1° in first pass and 17.25° in second pass. The red AOI is increased by 6° in first pass and 8.625° in second pass. Overall there is a decrease in average AOI of 4 degrees. This device has the same back focal length as the prior art Philips prism.

If this device is used in double pass for a reflective LCD system (see FIG. 6) then the improvement is more dramatic. Since the illumination is on-axis, there is no difference between AOI for first pass and second pass. The blue AOI is 11.25°, a decrease of 17.25° from the Philips prism. the red AOI is 19.875°, an increase of 9.625° from the Philips prism. Overall there is a decrease in average AOI of 5.1°. The maximum AOI is less than 20 degrees in this system. The maximum AOI can be further reduced by increasing the blue AOI. However, the mechanical constraints due to the panel size must be kept in consideration while altering the prism geometry.

Figure 6:
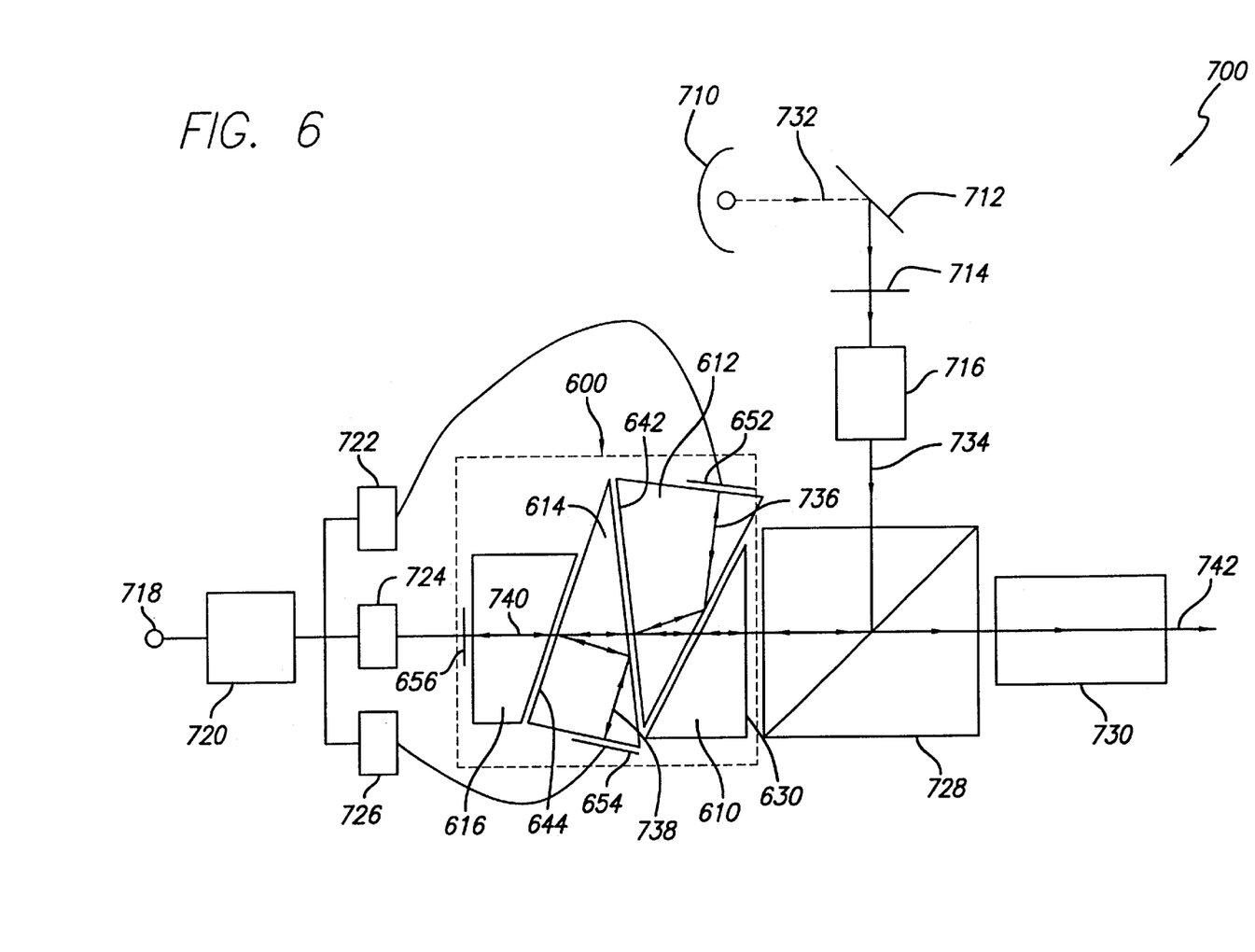
FIG. 6 is a diagram of reflective LCD projection system using the present invention in double pass designed in accordance with the teachings of the present invention.

FIG. 6 is a diagram of a reflective LCD projection system 700 using the present invention 600 in double pass designed in accordance with the teachings of the present invention. White light 732 generated by a lamp 710 is directed by a mirror 712 through a UV filter 714 and an Illumination Optics and Polarization Recovery Unit 716, producing a beam of s-polarized white light 734.

The beam of s-polarized white light 734 enters the polarization beam splitter 728 where it is reflected into the color management device 600 for color separation. 1The beam 734 enters the first prism 610 through the first surface 630 at a nominal AOI of 0 degrees. It passes through the first prism 610, through the air gap 620, and into the second prism 612. The beam of white light 734 impinges on the blue dichroic surface 642. Blue light separated from the white light 734 forms a blue beam 736. The blue beam undergoes total internal reflection at surface 632, and hits the blue reflective-LCD 652. If the LCD is in the "Off" state, the polarization of the blue beam 736 remains unchanged, and the ray will reverse its path until is gets back to the polarization beam splitter 728, where it will be reflected back up the illumination path. If the LCD is in the "On" state, the polarization of the blue beam 736 is rotated (to p-polarization), and the ray will reverse its path until is gets back to the polarization beam splitter 728, where it will be transmitted to the projection lens 730.

Red and green light from the white beam 734 are transmitted through the blue dichroic surface 642, through the air gap 624, and into the third prism 614. The red/green light impinges on the red dichroic surface 644, forming a red beam 738 which undergoes total internal reflection at surface 634, and hits the red reflective-LCD 654. If the LCD is in the "Off" state, the polarization of the red beam 738 remains unchanged, and the ray will reverse its path until is gets back to the polarization beam splitter 728, where it will be reflected back up the illumination path. If the LCD is in the "On" state, the polarization of the red beam 738 is rotated (to p-polarization), and the ray will reverse its path until is gets back to the polarization beam splitter 728, where it will be transmitted to the projection lens 730.

Green light 740 is transmitted by the red dichroic surface 644, through the air gap 626, and into the fourth prism 616. The green light 740 hits the green reflective-LCD 656. If the LCD is in the "Off" state, the polarization of the green beam 740 remains unchanged, and the ray will reverse its path until is gets back to the polarization beam splitter 728, where it will be reflected back up the illumination path. If the L,CD is in the "On" state, the polarization of the green beam 740 is rotated (to p-polarization), and the ray will reverse its path until is gets back to the polarization beam splitter 728, where it will be transmitted to the projection lens 730.

The output light 742 of the system is therefore p-polarized.

The red, green, and blue I,CDs are controlled by red, green, and blue LCD drivers 726, 724, and 722, respectively. The LCD drivers are controlled by an electronic decoder 720 which decodes the input signal 718.

Those skilled in the art will appreciate the dichroic surfaces 642, 644 may be interchanged. Furthermore, the dichroic surfaces 642, 644 may reflect another combination of colors without departing from the scope of the present invention. It is up to the coating designer to decide which is the most efficient way to split the colors.

In addition, the illumination optics and the projection lens 730 can be interchanged, such that p-polarized light enters the system and s-polarized light exits from the projection lens 730.

The 'purity' of a polarized light beam directly affects the contrast ratio of the projection system. Large prisms due to stress birefringence may degrade this purity. This can be reduced by using special low stress birefringence glass and by minimizing the stress on the glass in the prism mount.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A color management device for projection systems comprising first, second, third, and fourth prisms wherein:
    said first prism is disposed adjacent to said second prism;
    said second prism is disposed adjacent to said third prism;
    said third prism is disposed adjacent to said fourth prism;
    said first prism includes a first surface for inputting or outputting a beam of light;
    said second prism includes a first dichroic surface mounted at a first angle with respect to said first surface for reflecting light of a first color and for transmitting light of a second color and light of a third color, said first angle being approximately 11 degrees; and
    said third prism includes a second dichroic surface mounted at a second angle with respect to said first surface for reflecting light of said second color and for transmitting light of said third color.

2. The invention of claim 1 wherein an air gap is interposed between said first prism and said second prism.

3. The invention of claim 1 wherein an air gap is interposed between said second prism and said third prism.

4. The invention of claim 1 wherein an air gap is interposed between said third prism and said fourth prism.

5. The invention of claim 1 wherein said second angle is approximately 20 degrees.

6. The invention of claim 1 wherein said first and second dichroic surfaces are optimized for both s- and p-type polarized light.

7. The invention of claim 1 wherein said first, second, and third colors correspond to blue, red and green, respectively.

8. The invention of claim 1 wherein said first prism is constructed from a first material and said second, third, and fourth prisms are constructed from a second material.

9. A projection system comprising:
    a lamp for generating an input beam of white light;
    an illumination optics and polarization recovery unit for collimating and polarizing said beam of white light;
    a polarization beam splitter for reflecting said input light to a color management device and transmitting output light to a projection lens;
    a color management device for splitting said white light into three beams of first, second, and third colors and directing said three beams to corresponding liquid crystal display panels, and recombining said three beams to form an output beam of light and directing said output beam to said polarization beam splitter, said color management device comprising first, second, third, and fourth prisms wherein:
    said first prism is adjacent to said second prism;
    said second prism is adjacent to said third prism;
    said third prism is adjacent to said fourth prism;
    said first prism includes a first surface for inputting or outputting a beam of light;
    said second prism includes a first dichroic surface mounted at a first angle with respect to said first surface for reflecting light of a first color and for transmitting light of a second color and light of a third color; and
    said third prism includes a second dichroic surface mounted at a second angle with respect to said first surface for reflecting light of said second color and for transmitting light of said third color, said first and second dichroic surfaces being optimized for both s- and p-type polarized light;
    first, second, and third reflective liquid crystal display (LCD) panels corresponding to said first, second, and third colors;
    first, second, and third panel drivers for controlling said first, second, and third LCD panels;
    an electronic decoder for decoding an input signal and appropriately adjusting said first, second, and third panel drivers; and
    a projection lens for outputting said output light.

10. A color management device for projection systems comprising first, second, third, and fourth prisms wherein:
    said first prism is disposed adjacent to said second prism;
    said second prism is disposed adjacent to said third prism;
    said third prism is disposed adjacent to said fourth prism with an air gap therebetween;
    said first prism includes a first surface for inputting or outputting a beam of light;
    said second prism includes a first dichroic surface mounted at a first angle with respect to said first surface for reflecting light of a first color and for transmitting light of a second color and light of a third color; and
    said third prism includes a second dichroic surface mounted at a second angle with respect to said first surface for reflecting light of said second color and for transmitting light of said third color.

11. The invention of claim 10 wherein said second angle is approximately 20 degrees.

12. The invention of claim 10 wherein said first and second dichroic surfaces are optimized for both s- and p-type polarized light.

13. A color management device for projection systems comprising first, second, third, and fourth prisms wherein:
    said first prism is disposed adjacent to said second prism;
    said second prism is disposed adjacent to said third prism;
    said third prism is disposed adjacent to said fourth prism;
    said first prism includes a first surface for inputting or outputting a beam of light;
    said second prism includes a first dichroic surface mounted at a first angle with respect to said first surface for reflecting light of a first color and for transmitting light of a second color and light of a third color; and
    said third prism includes a second dichroic surface mounted at a second angle with respect to said first surface for reflecting light of said second color and for transmitting light of said third color, said second angle being approximately 20 degrees.

14. The invention of claim 13 wherein said first and second dichroic surfaces are optimized for both s- and p-type polarized light.

15. A color management device for projection systems comprising first, second, third, and fourth prisms wherein:

said first prism is disposed adjacent to said second prism;

said second prism is disposed adjacent to said third prism;

said third prism is disposed adjacent to said fourth prism;

said first prism includes a first surface for inputting or outputting a beam of light;

said second prism includes a first dichroic surface mounted at a first angle with respect to said first surface for reflecting light of a first color and for transmitting light of a second color and light of a third color; and said third prism includes a second dichroic surface mounted at a second angle with respect to said first surface for reflecting light of said second color and for transmitting light of said third color, said first and second dichroic surfaces being optimized for both s- and p-type polarized light.

* * * * *